(12) United States Patent
Dwyer et al.

(10) Patent No.: US 8,442,930 B2
(45) Date of Patent: May 14, 2013

(54) UNTANGLED EULER DIAGRAMS

(75) Inventors: Tim Dwyer, Seattle, WA (US); Nathalie Henry Riche, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 12/958,419

(22) Filed: Dec. 2, 2010

(65) Prior Publication Data

US 2012/0141972 A1    Jun. 7, 2012

(51) Int. Cl.
  *G06F 17/00* (2006.01)
  *G06N 5/00* (2006.01)

(52) U.S. Cl.
  USPC .......................................................... 706/45

(58) Field of Classification Search .................. 706/45
  See application file for complete search history.

(56) References Cited

U.S. PATENT DOCUMENTS

| | | | |
|---|---|---|---|
| 5,912,674 A | 6/1999 | Magarshak | |
| 6,847,979 B2 | 1/2005 | Allemang et al. | |
| 7,137,097 B1 | 11/2006 | Aji et al. | |
| 7,623,129 B2 | 11/2009 | Sagalov | |
| 7,664,717 B2 * | 2/2010 | Jenkins et al. | 706/45 |
| 7,714,862 B1 * | 5/2010 | Dwyer et al. | 345/440 |
| 7,720,773 B2 | 5/2010 | Szummer et al. | |
| 7,720,779 B1 * | 5/2010 | Perry et al. | 706/45 |
| 7,933,852 B2 * | 4/2011 | Jenkins et al. | 706/45 |
| 7,941,336 B1 * | 5/2011 | Robin-Jan | 705/7.13 |
| 8,140,479 B2 * | 3/2012 | Barlen et al. | 707/648 |
| 8,171,418 B2 * | 5/2012 | Law | 715/764 |
| 8,229,735 B2 * | 7/2012 | Robertson et al. | 704/9 |
| 8,326,823 B2 * | 12/2012 | Grandhi et al. | 707/717 |
| 8,364,021 B2 * | 1/2013 | Kuhn | 386/282 |

OTHER PUBLICATIONS

Elmqvist, et al., "DataMeadow: A Visual Canvas for Analysis of Large-Scale Multivariate Data", Retrieved at << http://www.cc.gatech.edu/~john.stasko/papers/vast07-rose.pdf >>, IEEE Symposium on Visual Analytics Science and Technology, Oct. 30-Nov. 1, 2007, pp. 8.

Kestler, et al., "Generalized Venn diagrams: a new method of visualizing complex genetic set relations", Retrieved at << http://bioinformatics.oxfordjournals.org/cgi/content/full/21/8/1592 >>, Nov. 30, 2004, pp. 9.

(Continued)

*Primary Examiner* — Michael B Holmes
(74) *Attorney, Agent, or Firm* — Michael B Dodd; Dodd Law Group

(57) ABSTRACT

A modified Euler diagram may use multiple convex shapes to display sets or members of sets. In one embodiment, a compact Euler diagram may represent members once, with the sets split into separate regions that may form a containment hierarchy over the members. The split set regions may be drawn with simple convex shapes and joined with connecting lines, which may be concave shapes. In another embodiment, each set may be illustrated with a single convex shape and the members of more than one set may be duplicated. In such an embodiment, the members may be drawn with convex shapes and joined with connectors, which may be concave shapes. The modified Euler diagrams may be deterministically created by grouping the elements into sets, organizing the sets by size, placing elements in the sets, and creating connections between the elements using a set of constraints.

20 Claims, 7 Drawing Sheets

OTHER PUBLICATIONS

Abello, et al., "ASK-Graph View: A Large Scale Graph Visualization System", Retrieved at << http://citeseerx.ist.psu.edu/viewdoc/download;jsessionid=F6A29F38EEF6CD9FC6045F0D54BF43DA?doi=10.1.1.141.342&rep=rep1&type=pdf >>, IEEE Transactions on Visualization and Computer Graphics, vol. 12, No. 5, Sep.-Oct. 2006, pp. 8.

Chow, Stirling Christopher., "Generating and Drawing Area-Proportional Euler and Venn Diagrams", Retrieved at << http://webhome.cs.uvic.ca/~schow/dissertation/dissertationTwoSided.pdf >>, 2007, pp. 326.

Collins, et al., "Bubble Sets: Revealing Set Relations with Isocontours over Existing Visualizations", Retrieved at << http://ieeexplore.ieee.org/stamp/stamp.jsp?tp=&arnumber=5290706 >>, IEEE Transactions on Visualization and Computer Graphics, vol. 15, No. 6, Nov.-Dec. 2009, pp. 1009-1016.

Dwyer, et al., "Exploration of Networks Using Overview+Detail with Constraint-Based Cooperative Layout", Retrieved at << http://citeseerx.ist.psu.edu/viewdoc/download?doi=10.1.1.160.8429&rep=rep1type=pdf >>, IEEE Transactions on Visualization and Computer Graphics, vol. 14, No. 6, Nov.-Dec. 2008, pp. 1293-1300.

Henry, et al., "Improving the Readability of Clustered Social Networks using Node Duplication", Retrieved at << http://www.dgp.toronto.edu/~anab/publications/Henry-InfoVis2008.pdf >>, IEEE Transactions on Visualization and Computer Graphics, vol. 14, No. 6, Nov. 2008, pp. 8.

Simonetto, et al., "Fully Automatic Visualisation of Overlapping Sets", Retrieved at << http://www.labri.fr/perso/simonett/Papers/EuroVis09.pdf >>, Computer Graphics Forum, vol. 28, No. 3, 2009, pp. 16.

Cui, Weiwei., "A Survey on Graph Visualization", Retrieved at << http://www.cse.ust.hk/~weiwei/PQE/WeiweiPQE.pdf >>, Technique report, Dec. 2007, pp. 55.

Bederson, et al., "Ordered and Quantum Tree maps: Making Effective Use of 2D Space to Display Hierarchies", Retrieved at << http://citeseerx.ist.psu.edu/viewdoc/download?doi=10.1.1.145.2634&rep=rep1&type=pdf >>, ACM Transactions on Graphics (TOG), vol. 21, No. 4, Oct. 2002, pp. 25.

Benoy, et al., "Evaluating the Comprehension of Euler Diagrams", Retrieved at << http://ieeexplore.ieee.org/stamp/stamp.jsp?tp=&arnumber=4272065 >>, 11th International Conference on Information Visualisation, Jul. 2-6, 2007, pp. 8.

Dwyer, et al., "IPSep-Cola: An Incremental Procedure for Separation Constraint Layout of Graphs", Retrieved at << http://ieeexplore.ieee.org/stamp/stamp.jsp?tp=&arnumber=4015435 >>, IEEE Transactions on Visualization and Computer Graphics, vol. 12, No. 5, Sep.-Oct. 2006, pp. 821-828.

Dwyer, et al., "Fast Node Overlap Removal", Retrieved at << http://ww2.cs.mu.oz.au/~pjs/papers/gd2005b.pdf >>, 2006, pp. 1-14.

Eades, et al., "Multilevel Visualization of Clustered Graphs", Retrieved at << http://www.lirmm.fr/~artignan/bib/EADE-FENG-96-1.pdf >>, Graph Drawing, Symposium on Graph Drawing, Sep. 18-20, 1996, pp. 101-112.

Elmqvist, et al., "Rolling the Dice: Multidimensional Visual Exploration using Scatterplot Matrix Navigation", Retrieved at << http://ieeexplore.ieee.org/stamp/stamp.jsp?tp=&arnumber=4658123 >>, IEEE Transactions on Visualization and Computer Graphics, vol. 14, No. 6, Nov.-Dec. 2008, pp. 1141-1148.

Fish, et al., "Defining Euler Diagrams: Choices and Consequences", Retrieved at << http://citeseerx.ist.psu.edu/viewdoc/download?doi=10.1.1.96.7623&rep=rep1&type=pdf. >>, Extended abstract at 2nd International workshop on Euler Diagrams, 2005, pp. 8.

Flower, et al., "Generating Euler Diagrams", Retrieved at << http://citeseerx.ist.psu.edu/viewdoc/download? doi=10.1.1.108.118&rep=rep1type=pdf >>, Proceedings Diagrams, 2002, pp. 15.

Freiler, et al., "Interactive Visual Analysis of Set-Typed Data", Retrieved at << http://ieeexplore.ieee.org/stamp/stamp.jsp?tp=&arnumber=4658148 >>, IEEE Transactions on Visualization and Computer Graphics, Nov. 2008, pp. 1340-1347.

Heer, et al., "Vizster: Visualizing Online Social Networks", Retrieved at << http://ieeexplore.ieee.org/stamp/stamp.jsp? tp=&arnumber=1532126 >>, IEEE Symposium on Information Visualization, Oct. 23-25, 2005, pp. 33-40.

Henry, et al., "NodeTrix: A Hybrid Visualization of Social Networks", Retrieved at << http://ieeexplore.ieee.org/stamp/stamp.jsp?tp=&arnumber=4376154 >>, IEEE Transactions on Visualization and Computer Graphics, vol. 13, No. 6, Nov.-Dec. 2007, pp. 1302-1309.

Howse, et al., "Spider Diagrams: A Diagrammatic Reasoning System", Retrieved at << http://citeseerx.ist.psu.edu/viewdoc/download?doi=10.1.1.107.6204&rep=rep1&type=pdf , Journal of Visual Languages and Computing, vol. 12, No. 3, Jun. 2001, pp. 70.

Jain, et al., "Data Clustering: a Review", Retrieved at << http://www.cs.rutgers.edu/~mlittman/courses/lightai03/jain99data.pdf >>, ACM Computing Surveys (CSUR), vol. 31, No. 3, Sep. 1999, pp. 264-323.

Kestler, et al., "Vennmaster: Area-proportional euler diagrams for functional go analysis of microarrays", Retrieved at << http://www.biomedcentral.com/1471-2105/9/67 >>, Jan. 29, 2008, pp. 12.

Kim, et al., "Visualizing set Concordance with Permutation Matrices and Fan Diagrams", Retrieved at << http://research.microsoft.com/en-us/um/redmond/groups/cue/publications/IwC2007-ConSet.pdf >>, Interacting with Computers, vol. 19, No. 5-6, Dec. 2007, pp. 630-643.

Koenig, et al., "Combining Dagmaps and Sugiyama Layout for the Navigation of Hierarchical Data", Retrieved at << http://hal.archives-ouvertes.fr/docs/00/15/38/62/PDF/dagmap_IEEE.pdf >>, 11th International Conference Information Visualization, Jul. 4-6, 2007, pp. 12.

Liu, et al., "The Role of convexity in Perceptual Completion: Beyond Good Continuation", Retrieved at << http://www.wisdom.weizmann.ac.il/~ronen/papers/Liu Jacobs Basri—The Role of Convexity in Perceptual Completion Beyond Good Continuation.pdf >>, Vision Research, vol. 39, No. 25, Dec. 1999, pp. 4244-4257.

Palla, et al., "Uncovering the overlapping community structure of complex networks in nature and society", Retrieved at << http://hal.elte.hu/~pallag/download/community_suppl.pdf >>, 2005, pp. 24.

Shneiderman, et al., "Network Visualization by Semantic Substrates", Retrieved at << http://ieeexplore.ieee.org/stamp/stamp.jsp?tp=&arnumber=4015424 >>, IEEE Transactions on Visualization and Computer Graphics, vol. 12, No. 5, Sep. 2006, pp. 733-740.

Spoerri, Anselm., "Infocrystal: A Visual Tool for Information Retrieval", Retrieved at << http://ieeexplore.ieee.org/stamp/stamp.jsp?tp=&arnumber=398863 >>, Conference on Information and Knowledge Management, Nov. 1-5, 1993, pp. 20.

Verroust, et al., "Ensuring the Drawability of Extended Euler Diagrams for up to 8 sets", Retrieved at << http://hal.archives-ouvertes.fr/docs/00/07/16/05/PDF/RR-4973.pdf >>, Oct. 2003, pp. 27.

\* cited by examiner

UNTANGLED EULER DIAGRAMS

BACKGROUND

Euler diagrams are used to show set membership for various objects. In an Euler diagram, an object may be a member of two, three, or more sets, while other objects may be a member of only one set. Conventional Euler diagrams use circles, ellipses, and other convex shapes to represent the sets and the members of overlapping sets. Euler diagrams are commonly used for very simple sets with limited numbers of objects because there is a limited number of configurations of overlapping circles to define the sets and intersections between sets. Practical applications of conventional Euler diagrams are usually limited to relatively small diagrams with limited numbers of objects and sets with simple intersections.

SUMMARY

A modified Euler diagram may use multiple convex shapes to display sets or members of sets. In one embodiment, a compact Euler diagram may represent members once, with the sets split into separate regions that may form a containment hierarchy over the members. The split set regions may be drawn with simple convex shapes and joined with connecting lines, which may be concave shapes. In another embodiment, each set may be illustrated with a single convex shape and the members of more than one set may be duplicated. In such an embodiment, the members may be drawn with convex shapes and joined with connection lines, which may be concave shapes. The modified Euler diagrams may be deterministically created by grouping the elements into sets, organizing the sets by size, placing elements in the sets, and creating connections between the elements using a set of constraints.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
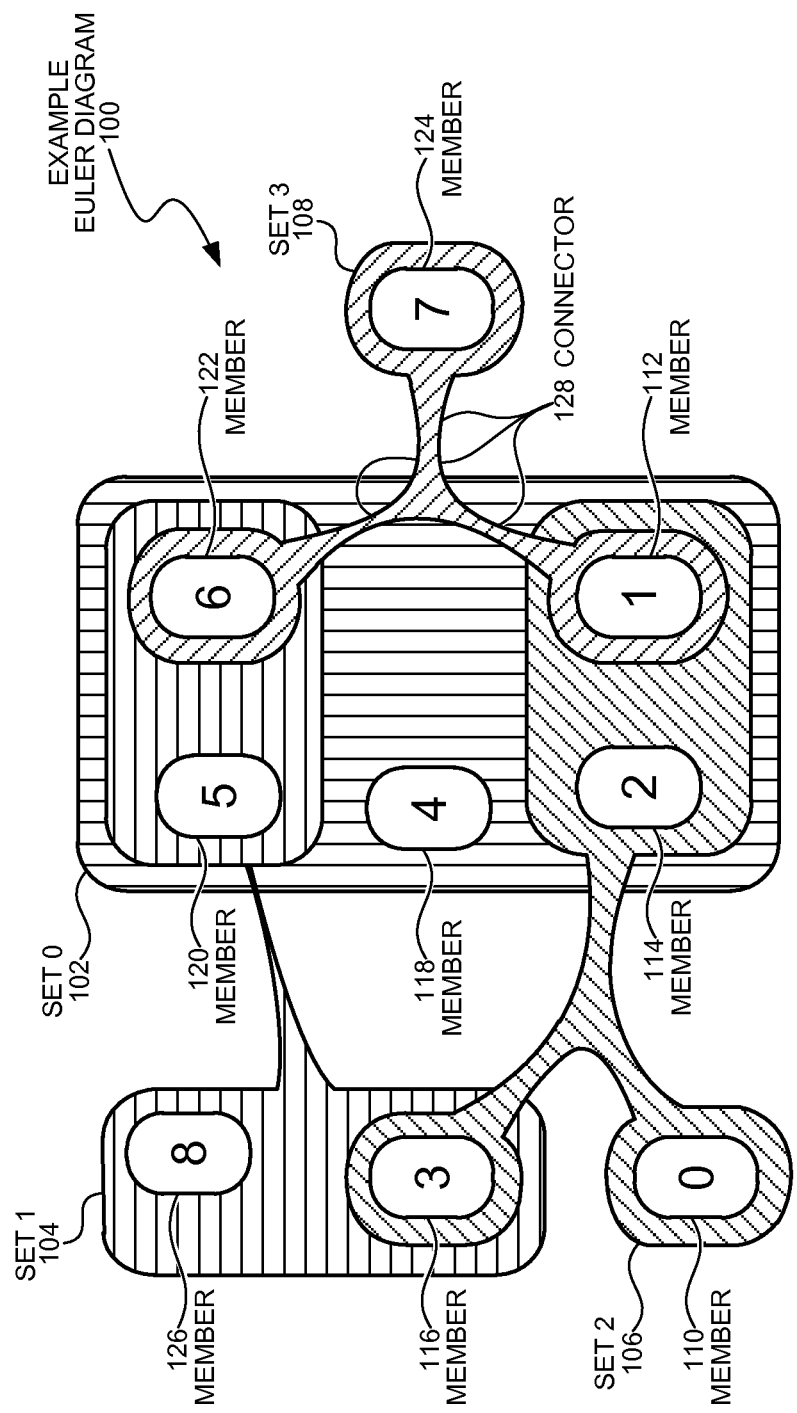
FIG. 1 is a diagram illustration of an example embodiment showing a first modified Euler diagram.

A modified Euler diagram may illustrate complex set relationships with large numbers of sets and set members by using convex shapes to illustrate the relationships. In one form, a graph may show each member only one time, with the sets being illustrated using multiple convex shapes. In another form, a graph may show each set as a convex shape and may show a member two or more times to illustrate membership in multiple sets, with the connections made using convex shapes. In many embodiments, different colors may be used to identify different sets and their members.

From the diagrams, a viewer may be able to identify the sets and the set members to understand the relationships between the sets and various members. The diagrams may be used to represent much more complex sets and relationships than classic Euler diagrams, and may be easier to read and comprehend than classic Euler diagrams.

Two different types of modified Euler diagrams may be created. In one type, each member of a set may be represented once and concave and convex graphical shapes may be used to illustrate set membership. In another type, each set may contain all of the members of the set in individual convex shapes, and members of multiple sets may have multiple instances of the members that may be joined using connectors, which may be concave shapes.

The graphs may be created using a computer to layout and organize the sets and their members, then to graphically join the sets and their members using a set of constraints to place objects within the graph and form connectors between objects. In some embodiments, the computer may allow a user to interact with the diagrams and change the design to a hybrid modified Euler diagram.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 2:
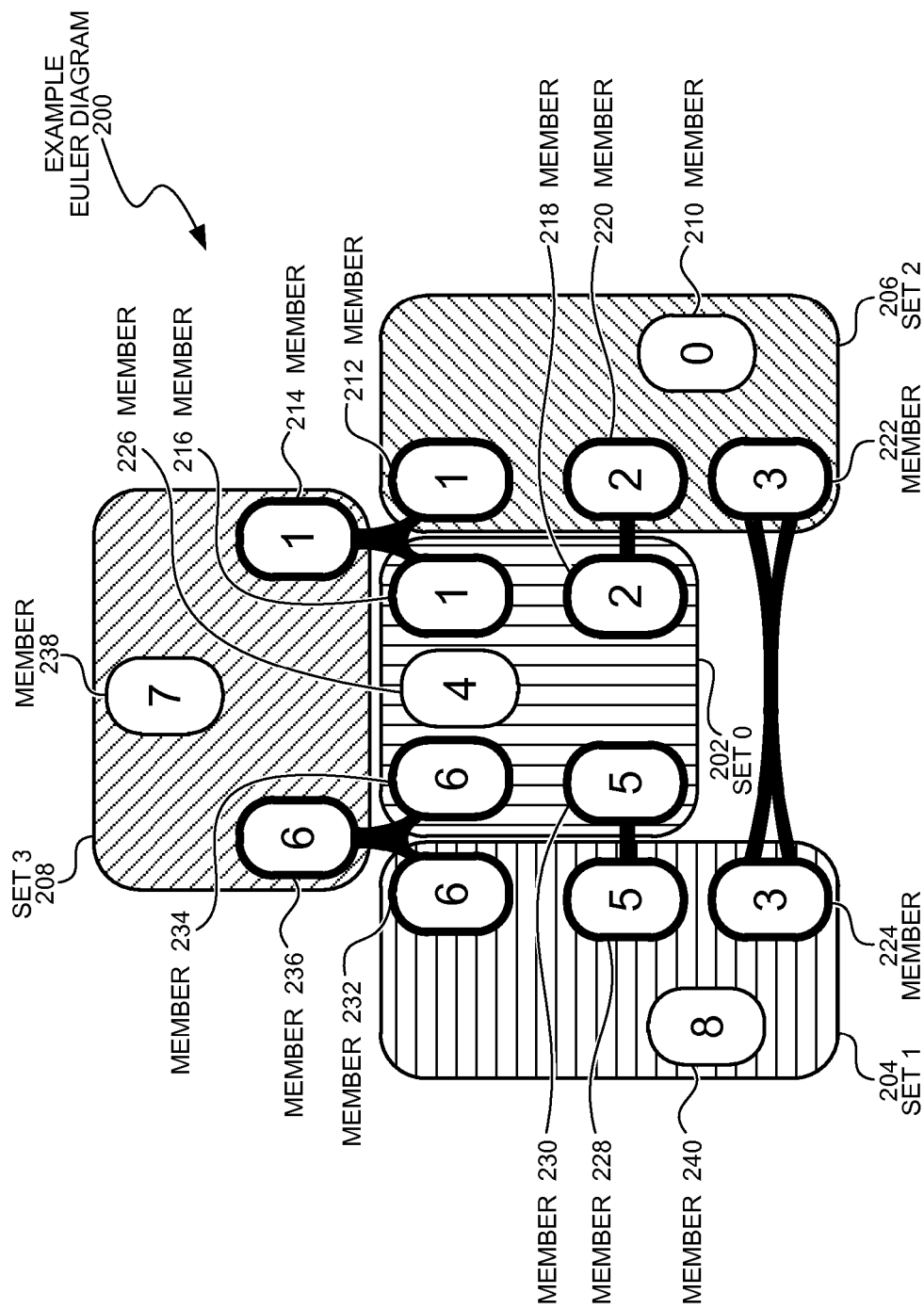
FIG. 2 is a diagram illustration of an example embodiment showing a second modified Euler diagram.
Figure 3:
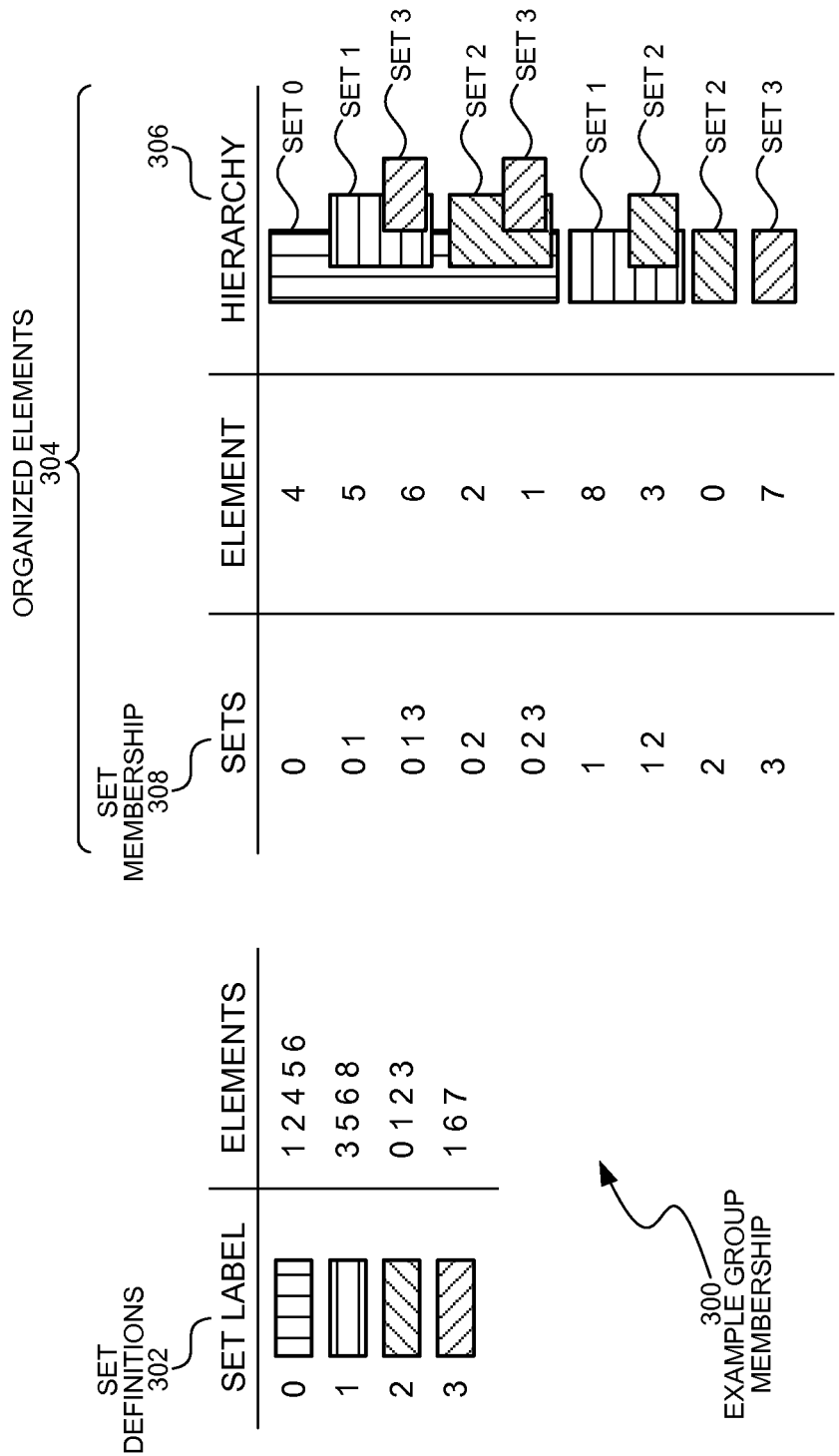
FIG. 3 is a diagram illustration of an example embodiment showing the group memberships used in the examples of FIGS. 1 and 2.

FIG. 1 is an example embodiment 100 showing a first type of modified Euler diagram. FIG. 2 is an example embodiment 200 showing a second type of modified Euler diagram. Both example embodiment 100 and 200 represent two different representations of the same data set.

Embodiment 100 illustrates an Euler diagram where the sets are highlighted. In the diagram of embodiment 100, each set member is presented only once, and the members are linked together to form sets in some cases. In contrast, embodiment 200 illustrates the same data set, but where each set is presented as a group. In embodiment 200, members that are located in two or more sets are linked together graphically.

Both embodiments show the data sets with intuitive graphical features that allow a user to quickly comprehend the relationships between data and to gather information from the graphs.

In embodiment 100, several sets are displayed. Set 0 102, set 1 104, set 2 106, set 3 108 are all illustrated with shaded areas around all of the members of the respective set. In the example of embodiment 100, member 0 110 is a member of set 2, while member 1 112 is a member of sets 0, 2, and 3. Member 2 114 is a member of sets 0 and 2. Member 3 116 is illustrated as being a member of sets 1 and 2. Member 4 118 is a member of only set 0. Member 5 120 is a member of 0 and 1, and member 6 122 is a member of set 0, 1, and 3. Member 7 is a member of set 3 only, and member 8 126 is a member of set 1 only.

Set 0 102 is the largest set within the diagram. Set 0 102 contains five members. Some of the members of set 0 are members of multiple sets. For example, member 1 112 is a member of sets 0, 2, and 3. For member 1 112, the outlines of each of the sets for which the member is a member encircles the label "1". Member 4 118 is not encircled by any other set other than set 0, indicating that member 4 118 is only a member of one set.

Some of the sets are illustrated as spanning several members, but by using connectors to connect between them. For example, set 3 108 has three members, 1, 6, and 7. Since each member of set 3 108 is located as either members of other sets or as only affiliated with set 3, set 3 108 is shown as three objects encircling the members and a connector 128 linking the members.

Some of the sets may be illustrated using convex shapes. For example, set 0 102 is illustrated using a rectangle shaped object. Set 1 104 is illustrated as having two convex shapes, one encircling members 5 and 6 and another encircling members 3 and 8. The convex shapes for set 1 104 are joined by a concave shaped connector.

Embodiment 200 illustrates the same data set as embodiment 100, but using a different type of diagram. Embodiment shows the sets within contiguous, concave areas. In the example of embodiment 200, the sets are shown within rectangular shapes. All the members are shown within each set, and when some items are in multiple sets, a separate instance of the member is illustrated in each of the member sets.

Sets 0 202, 1 204, 2 206, and 3 208 are shown separately. In some embodiments, subsets of another set may be shown as overlapping and completely contained within another set.

Within the diagram, member 0 210 is illustrated as being located only in set 2 206. Member 1 is a member of three sets, and therefore instances of member 1 212, 214, and 216 represent the memberships of sets 2, 3, and 0, respectively. Member 2 is a member of two sets, and therefore instances of member 2 218 and 220 represent the memberships of sets 0 and 2. Member 3 is a member of sets 1 and 2 and instances of member 222 and 224 represent those memberships. Similarly, member 4 is a member of only set 0, and is represented by a single instance of member 226. Member 5 is a member of two sets: 0 and 1, and is represented by instances of member 228 and 230. Member 6 is a member of sets 0, 1, and 3, and is represented by instances 234, 236, and 238. Member 7 is a member of set 3 and is represented by instance of member 238. Lastly, member 8 is a member of set 1 and is represented by member 240.

Embodiment 200 illustrates a diagram where each of the sets is illustrated using concave shapes. Each of the sets 202, 204, 206, and 208 are illustrated using rectangular, concave shapes. When an element or member belongs to two or more sets, the member may have instances of in each of the sets, and may be connected using a convex connector.

Embodiment 100 illustrates a compact version of the modified Euler diagram, as each member is shown only one time. Embodiment 100 may be a good diagram when highlighting individual items and how those items relate to other groups. In contrast, embodiment 200 illustrates a version of a modified Euler diagram where the groups are highlighted. Embodiment 200 may be easier for discussing specific groups and how the groups relate to specific items.

In some interactive embodiments, a hybrid version of the two types of diagrams may be created. Initially, the diagram may be a compact diagram such in embodiment 100. A user may interact with the diagram to select a set and pull the set away from the main part of the diagram. As the set is moved, the set may be drawn as a group linked to other instances of members common to other groups. Such an embodiment may be illustrated in embodiment 600 presented later in this specification.

Embodiments 100 and 200 both include labels for each of the members of the sets. In some embodiments, the set members may be presented with text strings such as names or other indicators as labels.

In both example embodiments, the labels may be presented in predominantly rectangular shaped objects with rounded corners. Similarly, the groups may be illustrated in predominately rectangular shaped objects with rounded corners. The rectangular objects with rounded corners of embodiments 100 and 200 are a design choice that may give a specific look and feel to the diagrams. Other embodiments may use ellipses, squares, polygons, or other shapes as a design element.

In several cases, elements within the diagram may be linked together using connectors. An example of a connector may be the links between elements 1, 6, and 7 that illustrate data set 3 in embodiment 100, or the links between the three instances of item 1 in data sets 0, 2, and 3 in embodiment 200. The connectors may be created by using splines or other drawing elements to show a link between the objects within the graphs. The thicknesses, curvature, and other design elements of the connectors may be design choices that vary between different embodiments.

In many embodiments, the graphs may be created by placing items in a space and establishing relationships between the items. A constraint algorithm may define the minimum spacing between various elements and may optimize the placement of items within the graph using force directed layout. Such an optimization may move items around within the graph to find a compact positioning for the various items.

Many embodiments may use heuristics or algorithms to attempt to create a deterministic and compact graph. Because of the optimization performed by the constraint driven, force directed layout, the layout and position of the various items may vary from one instance to another.

Embodiment 100 was constructed by organizing the sets by size, then organizing the members of the various sets so that the largest set is contiguous. Other sets that may be smaller in size may be broken into portions that may be connected with connectors.

Embodiment 200 was constructed by organizing the sets by size, then placing the first set in the graph and the set members within the set. The other sets were then placed in the graph and placement of the sets and set members were determined using a constraint driven force directed layout.

In the constraint driven force directed layout, the various objects in the graph are assigned relationships that define proximity to each other, as well as a set of constraints that may determine minimum spacing between various objects. The constraints may include, for example, a minimum distance from a set member to the edge of a set border, minimum distances between sets or set members within a set, and other parameters. Given the constraints and the relationships, a constraint driven force directed layout may find an optimum placement of the various components.

Embodiment 300 is an example diagram of an embodiment 300 showing how elements may be organized in order to create the diagram of embodiment 100.

The set definitions 302 show all of the various sets, the set labels, and the members or elements of the sets.

The organized elements 304 show a hierarchy 306 that may be traversed to layout the diagram of embodiment 100. The hierarchy 306 may be created using a heuristic that creates the largest set as the first set in the hierarchy, then applies the other sets on top of the largest set. In practice, such a hierarchy produces a readable and understandable graph.

As part of the organization, a set membership list 308 may be created for every element. The set membership list may be used to sort the elements prior to placement into a graph.

A process for organizing the elements or set members like embodiment 300 is shown in embodiment 400.

Figure 4:
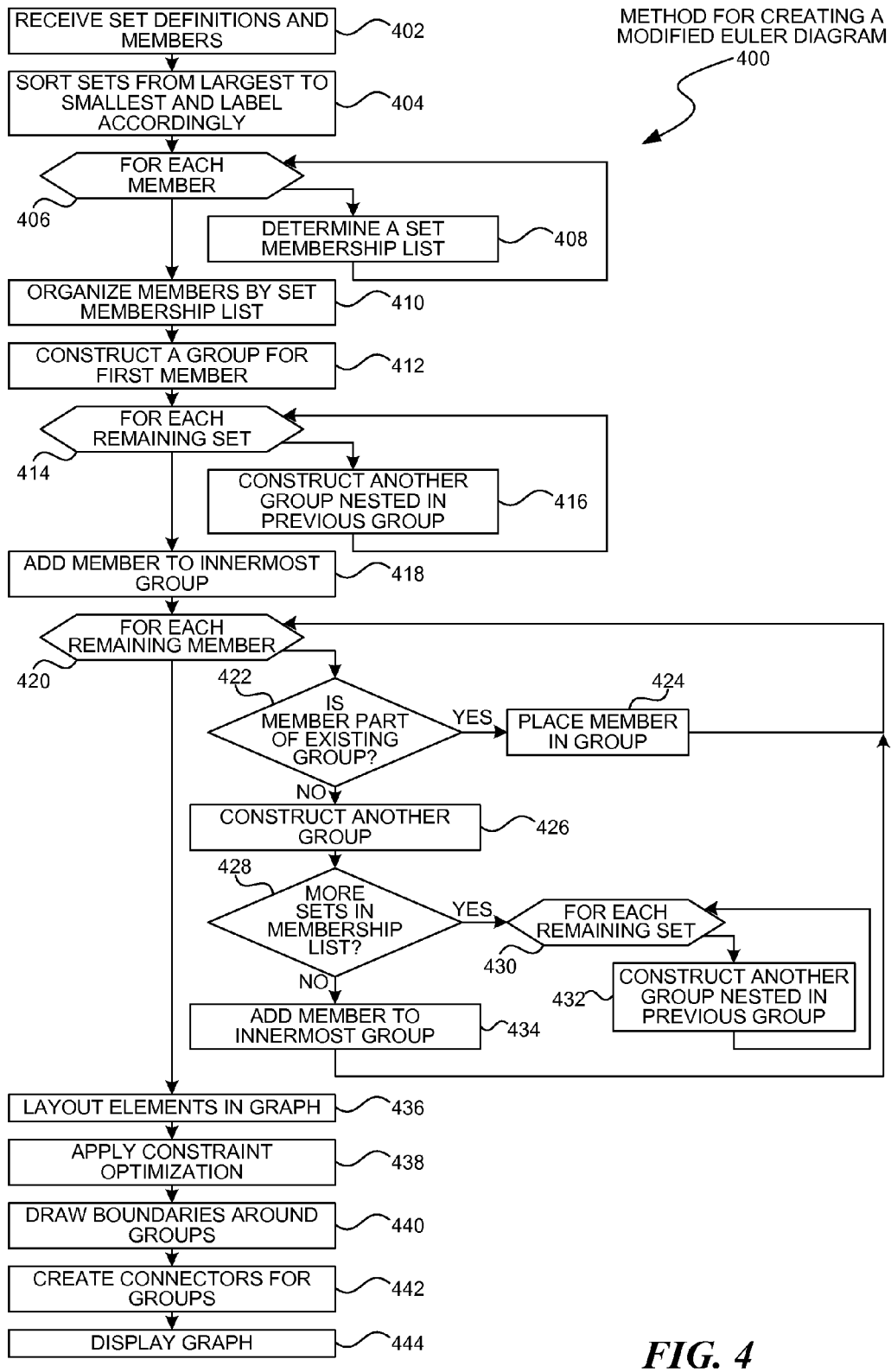
FIG. 4 is a flowchart illustration of an embodiment showing a method for creating a first type of modified Euler diagram.

FIG. 4 is a flowchart illustration of an embodiment 400 showing a method for organizing sets and members of sets, then producing a modified Euler diagram representing the sets. The process of embodiment 400 may organize elements in order for placement into a graph. The order may be deterministic so that recreating a graph from a data set or creating a graph with a slight change to a data set may generate similar results.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 organizes set members in a hierarchy for placement into a graph. The hierarchy may have the largest set at the top of the hierarchy, then other sets according to size. In many cases, a single element may be a member of multiple sets. Such members may be placed with the highest set in the hierarchy to which it belongs.

In block 402, the set definitions and members may be received. The set definitions and members may come in many different forms. In the example of embodiment 300, the set definitions 302 represent the input data.

The sets may be sorted from largest to smallest and may be labeled accordingly in block 404.

For each member of any set, a set membership list may be determined. A set membership list may list each set for which the element is a member. In many embodiments, the set membership list may be sorted by the set size, with the largest sized set being first in the set membership list.

The members may be organized or sorted according to the set membership list in block 410. An example of such a sorted list may be found in the organized elements 304 of embodiment 300.

In block 412, the layout of the graph may begin by constructing a group for the first member in the sorted list. The group constructed in block 412 may represent the base group or the set onto which other sets may be drawn.

The first element may have a set membership list. If so, each remaining set within the set membership list may be processed in block 414. For each remaining set in the first member's set membership list, another group may be constructed that is nested in the previous group in block 416.

Once all of the groups are constructed, the first member may be added to the innermost group in block 418.

Each remaining member in the sorted list of elements may be processed in block 420. For each remaining member in block 420, if the member is part of an existing group in block 422, the member may be placed in that group in block 424.

If the member is not part of any existing group in block 422, another group may be constructed in block 426. If more sets exist in the member's set membership list in block 428, for each remaining set in the set membership list in block 430, another group may be constructed nested in a previous group in block 432. After creating all of the groups within set membership list, the member may be added to the innermost group in block 434.

Through the process of blocks 412 through 434, the various members may be defined by relationships between members in the form of the sets, plus the constraints that may define the look and feel of the graphs. The objects within the graph may be laid out in block 436 and a constraint based force optimization routine may be applied in block 438 to optimize the placement of objects within the graph.

Once the placement is determined, boundaries around the groups may be drawn in block 440. In block 442, connectors within the groups may be created. The connectors may be drawn using splines, lines or other elements to join two groups that are members of the same set. After completing the connectors, the graph may be displayed in block 444.

The graph created from embodiment 400 may be similar to embodiment 100, where each member may be displayed only one time.

Figure 5:
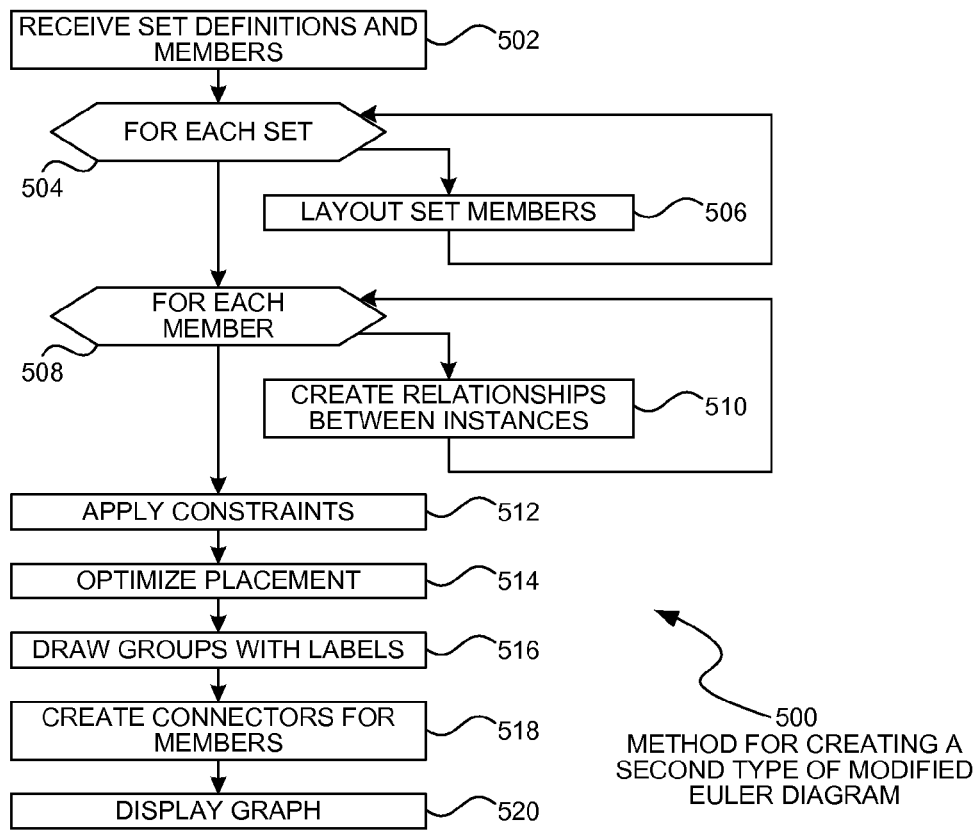
FIG. 5 is a flowchart illustration of an embodiment showing a method for creating a second type of modified Euler diagram.

FIG. 5 is a flowchart illustration of an embodiment 500 showing a method for creating a second type of modified Euler diagram. Embodiment 500 is one example of a method that may create a diagram such as the second modified Euler diagram of embodiment 200. The process of embodiment 500 may produce a modified Euler diagram where each of the sets may be displayed as concave item, and the elements that are members of multiple sets may be placed using multiple instances and joined with convex connectors.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The set definitions and members may be received in block 502.

For each set in block 504, the set members may be laid out in a group in block 506. When an element is a member of two or more sets, the member may have an instance for each set located within each group. Within each group, the members may be defined with constraints and relationships.

For each member in block 508, relationships may be created between instances of the member.

Any additional constraints may be applied in block 512 and a constraint based force optimization may be performed in block 514 to determine an optimized placement.

After determining the placement, the groups may be drawn in block 516 and connectors may be created between members in block 518. The graph may be displayed in block 520.

Figure 6:
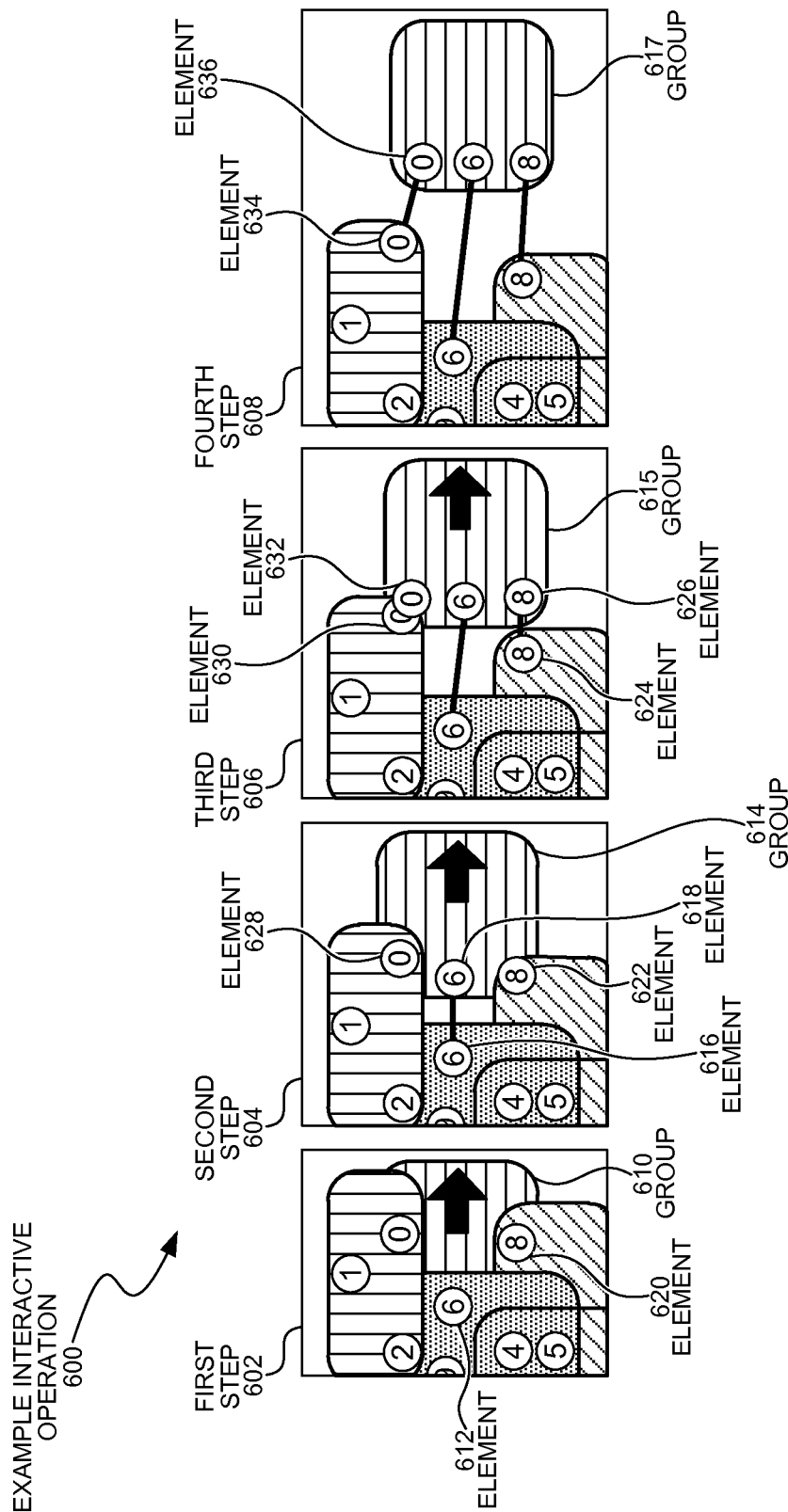
FIG. 6 is a diagram illustration of an example embodiment showing an interactive operation.

FIG. 6 illustrates an example embodiment 600 showing a progression of steps for an interactive graph. In the steps, a graph created using the first type of modified Euler diagram of embodiment 100 may be interactively modified to create a hybrid-type graph. In the example of embodiment 600, a user may select and drag a set away from the main body of the graph. As the user drags the set, members of the set that are also members of other sets may have a second instance of the member created and a connector drawn between them.

Embodiment 600 may be an interactive computer application that may create and present the various modified Euler diagrams. The interactive computer application may allow a user to edit, modify, and manipulate the diagrams.

Embodiment 600 is illustrated as several steps 602, 604, 606, and 608.

In step 602, a user may click on or otherwise select the group 610 and begin to move group 610 to the right. In step 604, the group 614 illustrates the group having been moved slightly to the right.

The element 612 in step 602 may be changed to two instances of the same element 616 and 618 when the group 614 may be moved. Element 612 may be split into two elements 616 and 618 and joined with a connector.

In the third step 606, the group 615 may be pulled even farther to the right. In the third step 606, the element 622 in step 604 may be split into two elements 624 and 626. Similarly, element 628 may be split into elements 630 and 632.

In the fourth step 608, the group 617 may be pulled yet farther to the right. Elements 630 and 632 may be spread apart as elements 634 and 636 and may be joined with a connector.

The sequence of embodiment 600 may illustrate an example of an interaction manipulation of a modified Euler diagram and how a hybrid modified Euler diagram may be created. The operations of embodiment 600 may be part of an interactive computer application that may create modified Euler diagrams.

Figure 7:
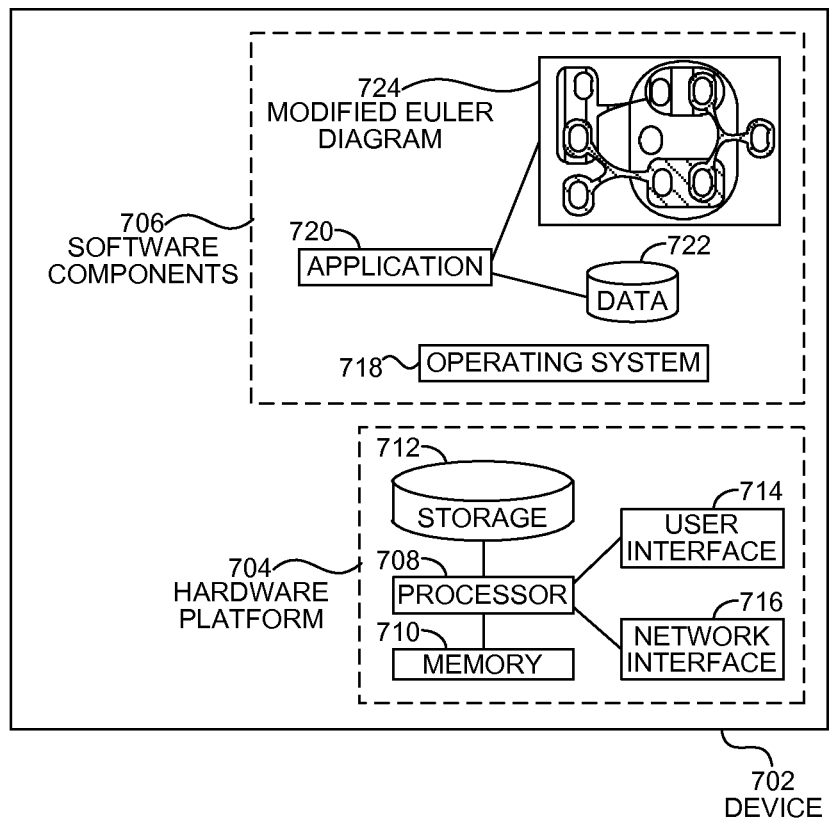
FIG. 7 is a diagram illustration of an embodiment showing a device that may have an application that creates and modifies modified Euler diagrams.

FIG. 7 is a diagram of an embodiment 700, showing a system that may have an application to create and manipulate modified Euler diagrams. Embodiment 100 is a simplified example of a hardware and software environment in which modified Euler diagrams may be constructed and manipulated.

The diagram of FIG. 7 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

A device 702 may contain a hardware platform 704 and some software components 706. The device 702 may represent a conventional computing platform, such as a personal computer, server computer, or laptop computer. In some embodiments, the device 702 may be a personal digital assistant, mobile telephone, game console, or other computing device.

The hardware platform 704 may contain a processor 708, random access memory 710, and nonvolatile storage 712. The hardware platform 704 may also include a user interface 714 and network interface 716.

The software components 706 may include an operating system 718 on which various applications may execute. An application 720 may receive data 722 and may create a modified Euler diagram 724 using various methods, such as the methods of embodiments 400 and 500.

In some embodiments, the application 720 may allow a user to create, manipulate, edit, store, retrieve, and perform various other functions on the modified Euler diagrams 724. In some such embodiments, a user may be able to interactively manipulate the modified Euler diagrams such as in the example of embodiment 600.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A graph illustrating a plurality of sets and a plurality of members of said sets, each of said members being a member of at least one of said sets, and at least one of said members being a member of at least two of said sets, said graph comprising:
   a plurality of elements, said elements representing said members and said sets;
   a first element being displayed by multiple convex shapes connected by at least one concave connector; and
   said members having a label.

2. The graph of claim 1, each of said members being displayed one time.

3. The graph of claim 1, at least one of members being displayed at least twice.

4. The graph of claim 1, said convex shapes being rectangular.

5. The graph of claim 1, said multiple convex shapes and said connector having a first background color.

6. The graph of claim 5, a second element being displayed by a second set of multiple convex shapes connected by at least one concave connector.

7. The graph of claim 6, said second element having a second background color.

8. The graph of claim 7, said first element and said second element being a first set and a second set.

9. The graph of claim 7, said first element and said second element being a first member and a second member.

10. A method performed on a computer processor, said method comprising:
    receiving a plurality of members, each of said members being a member of at least one set, at least one of said members being a member of at least two sets;
    creating a hierarchy of elements by a grouping method comprising:
       sorting said sets by a number of members in each set, said sets being sorted from largest to smallest;
       determining a membership list for each of said members, said membership list identifying sets for which said member is a member;
       organizing said members according to said membership list to create a list of members, said organizing comprising grouping said members;
    creating a graph by laying out said elements according to said hierarchy by a layout method comprising:
       processing each member from said list of members by identifying a group associated with said set and if said group is not created, creating said group, and adding said member to a last group in said membership list; and
       for each set, drawing a boundary around all groups associated with a set; and
    displaying said graph on a display device.

11. The method of claim 10, said boundary comprising at least one rectangular boundary.

12. The method of claim 11, said boundary comprising a non-convex bundle path.

13. The method of claim 12 further comprising:
    receiving a selection of a first group and a movement vector;
    translating said first group according to said movement vector; and
    recreating at least one bundle path.

14. The method of claim 13 further comprising:
    determining that a member of said first group is also a member of a second group;
    creating a representation of said member in said second group; and
    creating a second convex bundle path from a representation of said member in said first group to a representation of said member in said second group.

15. The method of claim 10 further comprising:
    determining a background color for each of said groups; and
    applying said background color within said boundary.

16. A method performed on a computer processor, said method comprising:
    receiving a plurality of members, each of said members being a member of at least one set, at least one of said members being a member of at least two sets;
    creating a graph by laying out said elements according to said hierarchy by a layout method comprising:
       for each of said sets, laying out said members within each set, at least two of said sets comprising a first member;
       applying a constraint driven force directed algorithm to optimize placement of said members within said sets; and
       create paths between each of said members being located in at least two of said sets; and
    presenting said graph on an output device.

17. The method of claim 16, said sets being arranged within rectangular boundaries.

18. The method of claim 17, said paths having a background color.

19. The method of claim 16 further comprising:
    receiving a second set of relationships, said second set of relationships comprising relationships between at least two of said members; and
    overlaying a graphical representation of said relationships onto said graph.

20. The method of claim 16 further comprising:
    identifying a first set being a subset of a second set; and
    displaying said first set within said second set.

* * * * *